US006899625B2

(12) United States Patent
Luciano, Jr. et al.

(10) Patent No.: US 6,899,625 B2
(45) Date of Patent: May 31, 2005

(54) COUNTDOWN GAME FOR A GAMING DEVICE

(75) Inventors: Robert Anthony Luciano, Jr., Reno, NV (US); William Judd Lloyd, III, Reno, NV (US)

(73) Assignee: Sierra Design Group, Las Vegas, NV (US)

( * ) Notice: Subject to any disclaimer, the term of this patent is extended or adjusted under 35 U.S.C. 154(b) by 136 days.

(21) Appl. No.: 09/782,177

(22) Filed: Feb. 12, 2001

(65) Prior Publication Data

US 2001/0034260 A1 Oct. 25, 2001

Related U.S. Application Data

(60) Provisional application No. 60/182,321, filed on Feb. 14, 2000.

(51) Int. Cl.[7] .................................................. A63F 13/00
(52) U.S. Cl. ........................................... 463/25; 463/20
(58) Field of Search ............................... 463/16–22, 25, 463/29; 273/138.1, 139, 138.2, 143 R

(56) References Cited

U.S. PATENT DOCUMENTS

| | | | | | |
|---|---|---|---|---|---|
| 5,553,851 | A | * | 9/1996 | Malavazos et al. | 137/505.36 |
| 5,823,874 | A | | 10/1998 | Adams | |
| 5,848,932 | A | | 12/1998 | Adams | |
| 5,871,398 | A | * | 2/1999 | Schneier et al. | 463/16 |
| 5,882,261 | A | | 3/1999 | Adams | |
| 5,984,782 | A | * | 11/1999 | Inoue | 463/20 |
| 6,089,978 | A | | 7/2000 | Adams | |
| 6,105,962 | A | | 8/2000 | Malavazos et al. | |
| 6,168,520 | B1 | | 1/2001 | Baerlocher | |

FOREIGN PATENT DOCUMENTS

| | | | | |
|---|---|---|---|---|
| GB | 2191030 | * | 12/1987 | G07F/17/34 |
| GB | 2262642 | * | 6/1993 | G07F/17/34 |
| JP | 05285252 | * | 11/1993 | A63F/5/04 |
| JP | 6-91034 | * | 4/1994 | A63F/5/04 |

* cited by examiner

*Primary Examiner*—John M. Hotaling, II
(74) *Attorney, Agent, or Firm*—Russ F. Marsden

(57) ABSTRACT

A countdown game which is played in conjunction with a primary game on a gaming device or other game player terminal is disclosed herein. The countdown game enhances bonus game play by providing a "countdown indicator" which advances and retreats through various stages or levels of play. The player further accumulates a prize amount which may be won, lost or increased during play.

11 Claims, 4 Drawing Sheets

COUNTDOWN GAME FOR A GAMING DEVICE

RELATED APPLICATION

This application claims priority to the provisional application entitled "COUNTDOWN GAME," Ser. No. 60/182,321 filed on Feb. 14, 2000.

BACKGROUND OF THE INVENTION

1. Field of the Invention

This invention pertains generally to gaming devices. More particularly, the invention is a countdown game suitable for use with a gaming device having a primary game.

2. The Prior Art

Secondary bonus games for use with gaming devices are known. For example, secondary games have been regularly implemented as a "top box" game in conjunction with slot-type wagering devices. One popular bonus game is taught in U.S. Pat. No. 5,848,932 to Adams entitled "METHOD OF PLAYING GAME AND GAMING GAMES WITH AN ADDITIONAL PAYOUT INDICATOR". The Adams patent discloses a bonus payout indicator comprising a wheel, which indicates one of a plurality of randomly selected bonus payouts, the bonus payout wheel used in conjunction with a three-reel slot machine. The bonus payout wheel is actuated when the reels on the slot machine stop on certain predetermined indicia and pays the player according to the bonus payout indicator. Many similar games appear in the European gaming market.

Such bonus games provide the player with additional excitement and amusement above and beyond game results from the primary (e.g., three reel slot) game. However, many bonus games, including the bonus game disclosed in Adams, provide limited excitement and amusement in that play on the secondary game is limited to a single action or event, such as activating a bonus wheel or otherwise generating a random "bonus" result.

In contrast, investment bonus games provide the added excitement of allowing the user to "earn" the bonus award based on a plurality of events (as opposed to a single event) in the primary game. For example, the "Bonus Bell" game by Mills™ allows the users to collect the letters forming the word "BONUS" during play of the primary slot game. After the player collects the entire group of letters to form the word "BONUS", the player is awarded a predetermined bonus amount.

Unfortunately, most prior art investment bonus games are linear or otherwise lack a diversity of outcome. That is, most investment bonus games are structured so that the bonus is awarded upon a fixed or predetermined event (e.g., collecting the words "BONUS"). The player generally plays enough credits so as to satisfy the requirement for the bonus award event. Such game play has limited excitement and amusement to a player.

BRIEF DESCRIPTION OF THE INVENTION

To satisfy these and other disadvantages of the prior art, disclosed herein is a countdown game which is played in conjunction with a primary game on a gaming device or other game player terminal. The countdown game enhances bonus game play by providing a "countdown indicator" which advances and retreats through various stages or levels of play. The player further accumulates a prize amount which is stored (or collected) and which may be won, lost or increased during play.

According to one embodiment of the invention, the countdown game comprises a countdown indicator, a prize value indicator, a countdown indicator adjuster, and a prize collection display.

The countdown indicator comprises a plurality of stop positions and counts down from an initial position. Some of the stop positions are identified as "winning" stops while others are "non-winning" stops. A "top award" stop position (e.g., 1) may also be provided, where a player is awarded some "top award" when the countdown indicator counts down and lands on the "top award" stop position. The countdown indicator is responsive to game results of the primary game (or a plurality of primary games) as well as to the countdown indicator adjuster as described more fully below. The countdown indicator may be responsive play from a plurality of primary games, where, for example, a bank of primary games are tied to a single countdown game, each player of the primary game participating on play in the countdown game (e.g., in a competitive or cooperative format).

The prize value indicator may comprise a plurality of prize values, at least one of which is indicated by the prize value indicator. The indicated prize value may be accumulated into an accumulated prize value, which is indicated to the user by the prize collection display. The prizes indicated by the prize value indicator may comprise such awards as play credits, currency amounts, tangible prizes, free games or re-plays on the primary game, for example. The prizes may even be a combination of any such awards. Some prizes may be accumulated, but may require that a designated countdown stop position be achieved before being awarded.

The countdown indicator adjuster comprises a plurality of stop adjustments, one of which is indicated by the countdown indicator adjuster. According to the indicated stop adjustment, the countdown indicator adjuster is configured to adjust the countdown indicator in either direction—forward (i.e., count down zero or more stop positions) or backward (i.e., count-back one or more stop positions). According to one embodiment, a "blank" or "reset" stop adjustment is further available for selection by the countdown indicator adjuster. If the countdown indictor adjuster lands on or otherwise selects the "blank" stop adjustment, the accumulated prize value in the prize collection display is reset, and the countdown indicator is reset to its initial position. According to other embodiments of the invention, the stop adjustments may specify adjustments to the primary game, such as reel nudging, re-spins of reels, or bonus game play on the primary game, for example.

The countdown game is triggered by the play on the primary game. For example, the triggering event may be any win, special symbol(s), or other designated display indicators occurring on the primary game. In addition, the primary game may be any game of chance (e.g., slots, poker, keno, bingo) or lottery-based game (e.g., video-lottery).

When a triggering event occurs on the primary game, the countdown indicator is activated to countdown a predetermined number of stop positions (e.g., one stop position or a number of stop positions as indicated by the triggering event). The triggering event may also specify a direction (e.g., forward, backward, random) for the adjustment. In addition, the prize value indicator and the countdown indicator adjuster are activated. The prize value (or prize item) indicated by the prize value indicator is added to (or collected into) the accumulated prize value (which may be initially set to zero (0) or some other predetermined or designated reset value). The accumulated prize value is then indicated by the prize collection display, which may display such information as total accumulated prize value or images depicting the prize(s) in the accumulated prize value.

The stop adjustment indicated by the by countdown indicator adjuster is also applied to adjust the stop position of the countdown indicator (i.e., forward, backward, reset or no adjustments). If the countdown indicator lands on a "winning" stop position, the player is awarded some or all of the prize value as indicated by the prize collection display. If the countdown indicator lands a "non-winning" stop position, the player may not be awarded the prize value indicated by the prize collection display, but the player may accumulate further prize values during successive games.

Under this countdown game play, the player progresses (and regresses) through stages or levels as indicated by the countdown indicator, providing more excitement and fun. In addition, the player accumulates a growing prize value as the player progresses/regresses. Furthermore, the countdown indicator adjuster provides yet another variable which affects the player's outcome of the countdown game. According to some contemplated embodiments, resets may occur due to other variances, such as due to time. In yet other embodiments, resets may not be applied at all, and the countdown indicator may be allowed to complete its cycle without resetting to the initial position.

According to one embodiment of the invention, the determination of whether the countdown indicator lands a "winning" or "non-winning" stop position is not carried out until after the countdown indicator adjuster has adjusted the countdown indicator. According to another embodiment of the invention, if a countdown indicator lands on a "non-winning" stop position, the countdown indicator will reset to its initial position and the prize collection display is reset to a reset value if the player does not achieve a triggering event in the subsequent play of the primary game. Under this arrangement, a number of consecutive triggering events on the primary game must occur to win the "top award." In other embodiments, the countdown game may allow a predetermined number of (or series of) non-triggering game events before the countdown game is reset. In yet other embodiments, countdown game resets need not be implemented pursuant to non-triggering primary game events. In one example embodiment, the non-triggering event does not produce a reset, but may adjust the countdown indicator in the reverse direction.

According to the preferred embodiment of the invention, the countdown indicator comprises a first wheel, the prize value indicator comprises a second wheel, and the countdown indicator adjuster comprises a third wheel, where the first, second and third wheels comprise concentric wheels.

The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
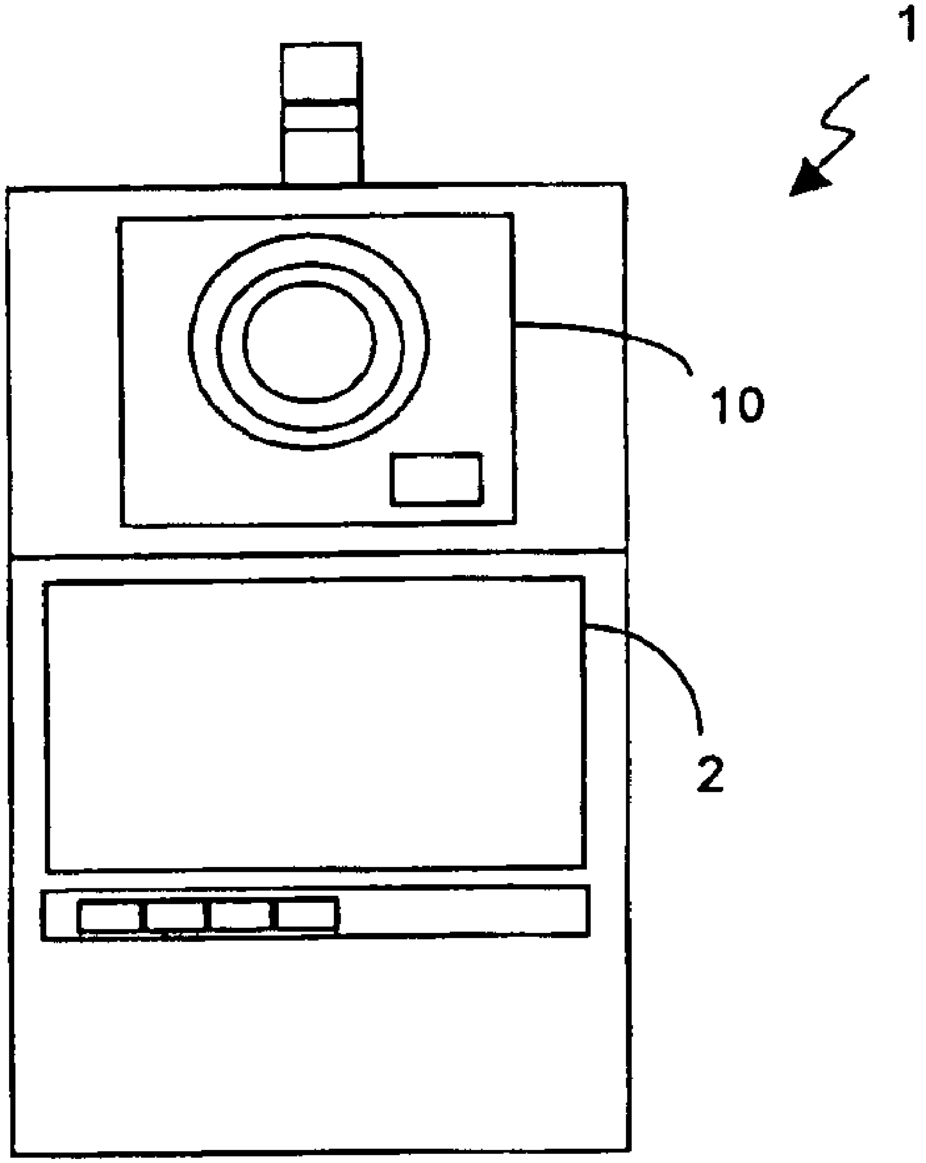
FIG. 1 depicts an example gaming device implementing the countdown game of the present invention.
Figure 2:
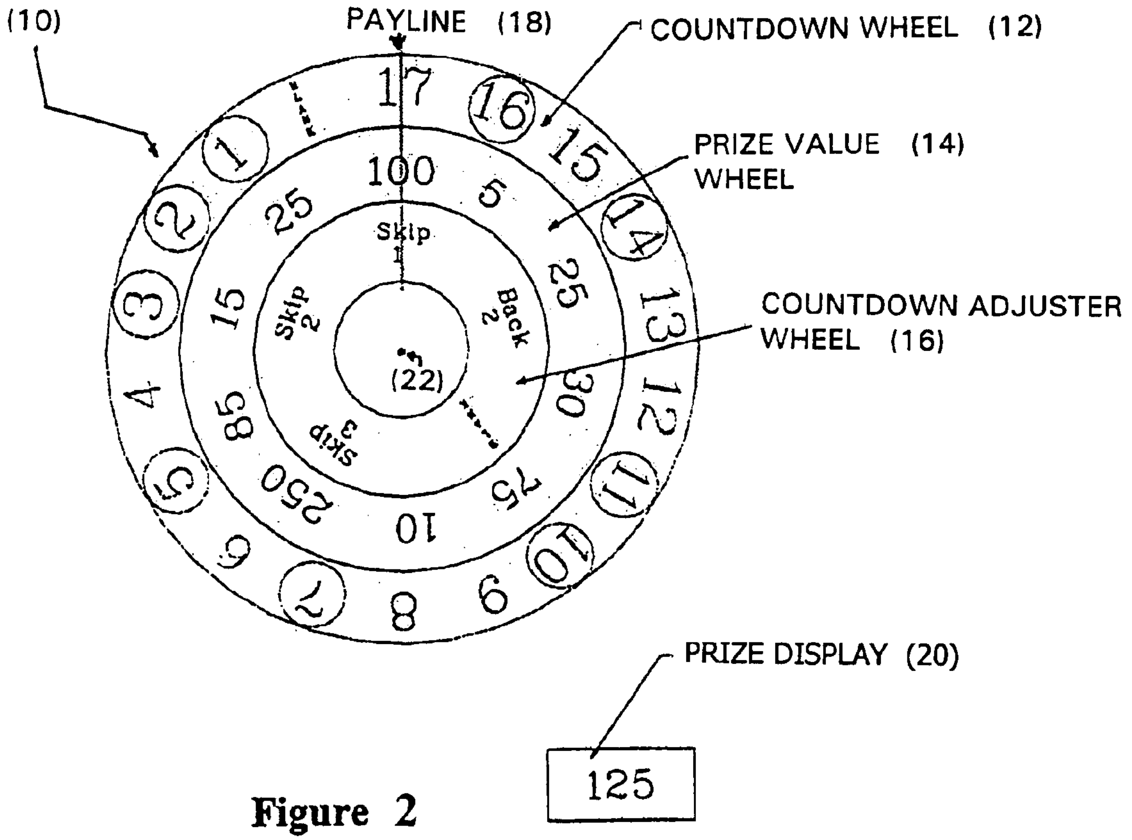
FIG. 2 depicts an example embodiment of the countdown game in accordance with the present invention.
Figure 3:
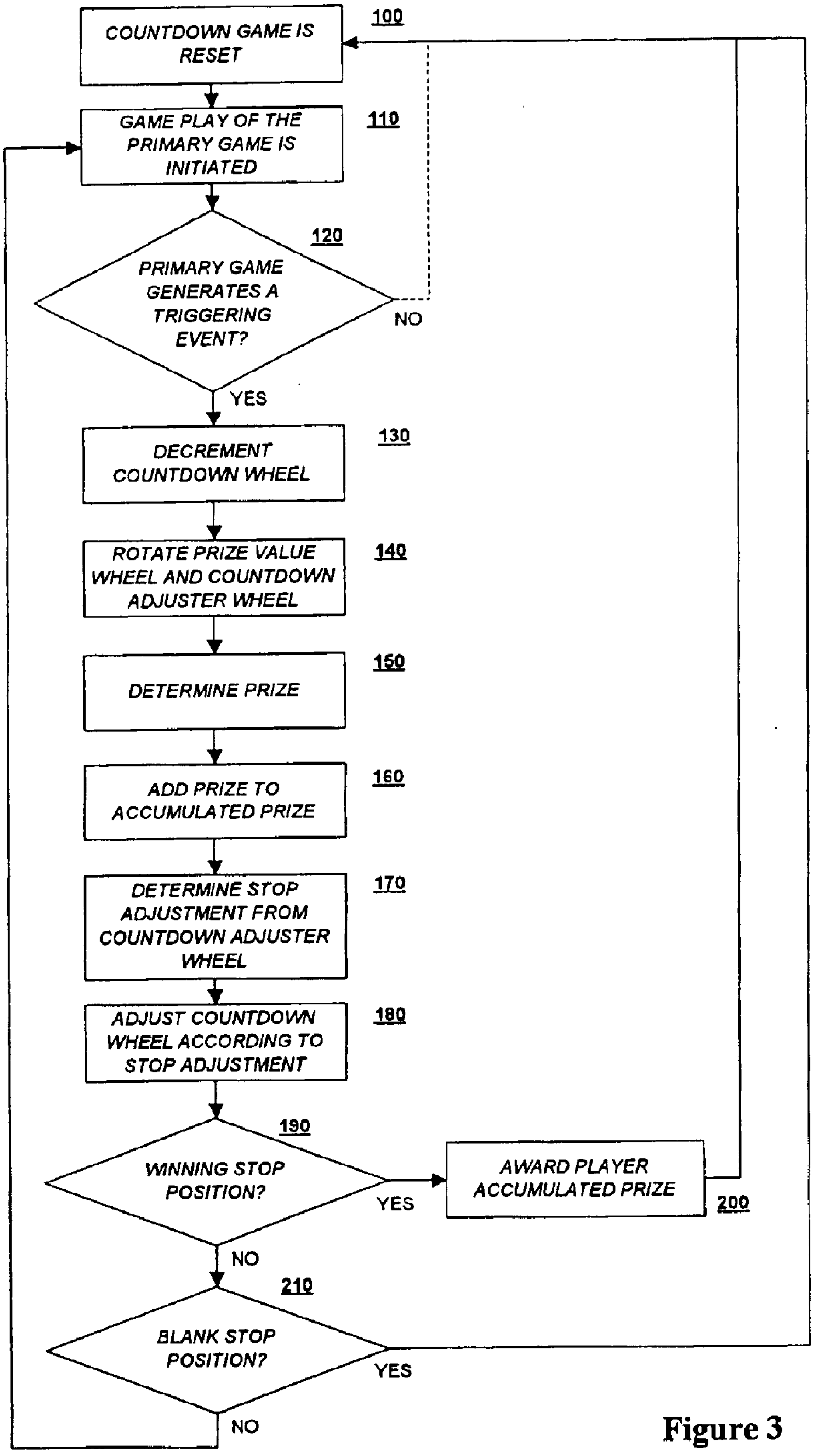
FIG. 3 is a functional block diagram depicting the acts associated with carrying out the example countdown game of FIG. 2.
Figure 4:
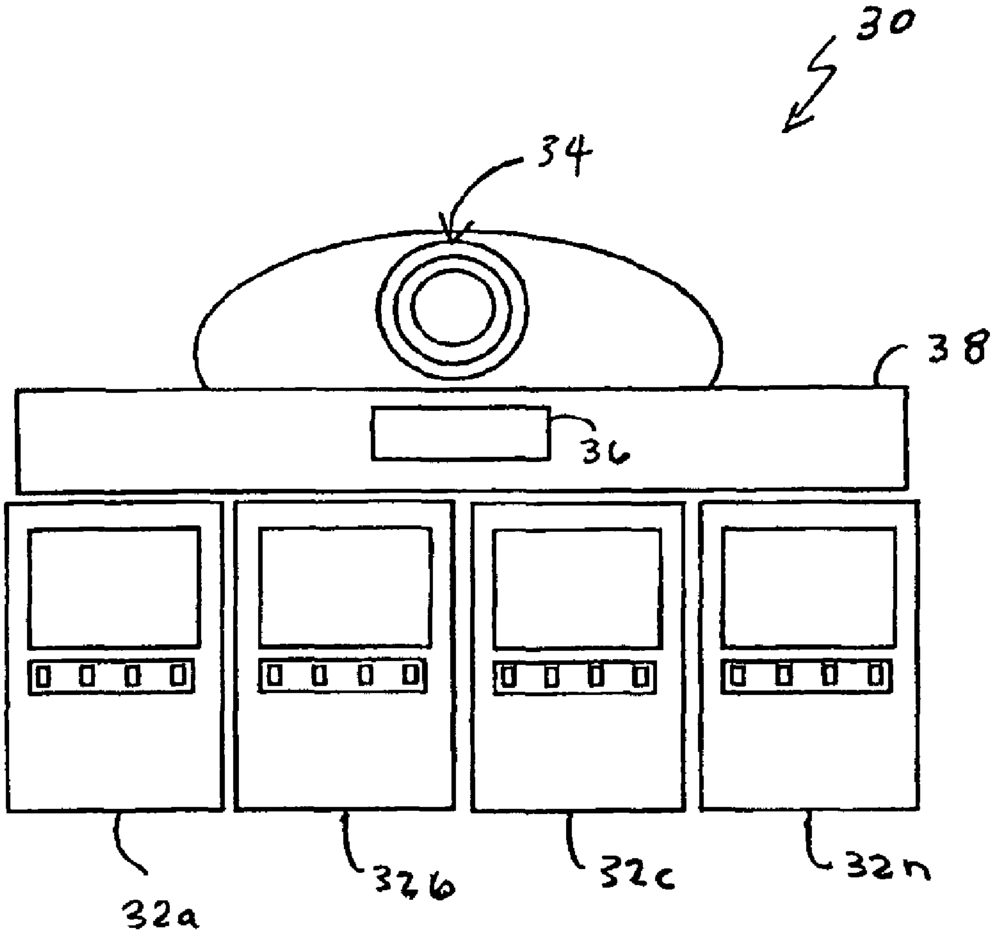
FIG. 4 depicts an example implementation of the countdown game with a bank of primary game devices.

Referring more specifically to the drawings, for illustrative purposes the present invention is embodied in the apparatus shown FIG. 1, FIG. 2, and FIG. 4 and the method outlined in FIG. 3. It will be appreciated that the apparatus may vary as to configuration and as to details of the parts, and that the method may vary as to details and the order of the acts, without departing from the basic concepts as disclosed herein. The invention is disclosed generally in terms of a countdown game for use with gaming devices, although numerous other uses for the invention will suggest themselves to persons of ordinary skill in the art.

Referring to FIG. 1, the countdown game 10 of the present invention is normally implemented as a "secondary" game on a conventional gaming device 1 having a primary game 2, such as a slot machine, video poker machine, keno machine, video lottery machine, among others. A triggering event (or "qualifying" event) on the primary game 2 triggers play of the countdown game 10. As noted above, the triggering event may be any win, special symbol(s), or other designated display indicators occurring on the primary game. The countdown game may award prize in such forms as game credits, currency, game plays and/or tangible prizes to the player, based on the combined outcome of the primary game 2 and the countdown game 10.

The gaming device 1 suitable for use with the countdown game comprises conventional hardware and software components (not shown), including a processor, input/output devices (e.g., player controls, game displays, credit handling), a primary game operable on the processor, and communication means to the countdown game. The gaming device 1 may also include network communication means for integration in a local area network, wide area network, or other network arrangement for such purposes as player tracking, accounting, maintenance, progressive games, cashless play, and/or other system gaming capabilities. In general, the gaming device manages the wager and payouts, as well as accounting features for both the primary game and the countdown game.

The present invention contemplates the use of the countdown game with a plurality of gaming devices, as shown in the system environment 30 of FIG. 4. In FIG. 4, the countdown game 34 is associated with a "bank" having a plurality of gaming devices 32*a* through 32*n*, each gaming device configured to play the countdown game 34 when an appropriate triggering event occurs on the gaming device. The countdown game 34 is mounted in a housing 38 and further includes display 36 which may be used as a prize display, which is described in further detail below in conjunction with FIG. 2. The display 36 may also be used to display specific prizes pursuant to the countdown game, such as a progressive jackpot, for example.

According to an alternative embodiment of the system environment 30 of FIG. 4, the gaming devices 32*a* through 32*n* may be configured as gaming device 1 of FIG. 1, each having an "individual" countdown game 10, and sharing a "common" countdown game 34. This arrangement creates even more excitement and competitive play among players due to the multi-tiered countdown game arrangement which allows even more diverse game play. The triggering event for the "common" countdown game 34 may be made according to various events, including those from the primary game and/or the individual countdown game for each game device.

Referring now to FIG. 2, there is shown an example countdown game 10 in accordance with one preferred embodiment of the present invention. Countdown game 10 may be implemented as a "top box" game in association with a primary game on a gaming device. Other means for implementing countdown game 10 may also be used, including using the video display of the primary game to display countdown game 10, for example.

Countdown game 10 comprises a "countdown indicator" in the form of a countdown wheel 12, a "prize value indicator" in the form of a prize value wheel 14, and a "countdown indicator adjuster" in the form of a countdown adjuster wheel 16. Countdown game 10 further comprises a payline 18 and a "prize collection display" in the form of a prize display 20.

In general, wheels 12 through 16 are concentrically positioned about the same axis 22, each wheel 12 though 16 having indicia indicated on the periphery for display to the user (player) of countdown game 10. The rotation and control of the wheels 12 through 16 according to the logic of the countdown game 10 may be carried out using conventional electromechanical wheel-control system known in the art.

Countdown wheel 12 includes indicia along its periphery corresponding to a plurality of stop positions. The "current" stop position is indicated by the payline 18 across the countdown wheel 12. In the example game of FIG. 1, countdown wheel includes numerical stop positions identified by the numbers 1 through 17 and an initial stop position identified as "BLANK". In other embodiments, the "BLANK" stop position may be omitted or substituted with other indicia, such as the starting position from which count down begins. In alternative embodiments of the invention, the countdown stop position may be indicated by other symbols or indicators, rather than the numerical countdown as illustrated in FIG. 1.

It is noted that numbers 1, 2, 3, 5, 7, 10, 11, 14, and 16 are circled to be distinguished from the others numbers 4, 6, 8, 9, 12, 13, 15, and 17. In this example, the circled numerical stop positions are considered "winning" stop positions, while the non-circled numerical stop are considered "non-winning" stop positions. In alternative embodiments of the invention, the designated "winning" and/or "non-winning" stop positions may be dynamically changed or reassigned during or between play. For example, the "winning" stop positions may be adjusted according to a predetermined routine (e.g., move forward on each play) or may be adjusted according to triggering events on the primary game or may be adjusted according to events on the countdown game (e.g., adjustments pursuant to the countdown adjuster wheel 16).

Some prizes may be specified for award on certain stop positions. For example, a "top prize" (e.g., progressive jackpot) may be specified when a player is able to reach stop position "1."

According to the present example embodiment of FIG. 1, when play is first initiated (or otherwise reset), the countdown wheel 12 is reset to the initial position "BLANK". From the "BLANK" position, the countdown wheel 12 "counts down" from 17 to 1 (counter-clockwise) as dictated by play (i.e., results from the primary game as well as results from the countdown adjuster wheel 16) as described further below. In some cases, the countdown wheel 12 adjusts in a "reverse" direction (clockwise) as described further below. In one of the preferred embodiments, the countdown game 10 is reset (i.e., the countdown wheel 12 is reset to "BLANK" and the prize display 20 is reset to "zero" or some other reset value) when a non-triggering event occurs on the primary game. In other embodiments, the countdown game may allow a predetermined number of (or series of) non-triggering game events before the countdown game is reset. In yet other embodiments, countdown game resets need not be implemented pursuant to non-triggering primary game events. In one example embodiment, the non-triggering event does not produce a reset, but may adjust the countdown indicator in the reverse direction.

The prize value wheel 14 includes indicia along its periphery corresponding to a plurality of prize values. The selected or identified prize value is indicated by the payline 18 across the prize value wheel 14. The example prize values as shown in FIG. 1 include 100, 5, 25, 30, 75, 10, 250, 85, 15, and 25. In other embodiments, the prizes may include other awards, such as tangible prizes (e.g., cars, motorcycles, jewelry, vacation packages) or other awards other than game credits, such a free plays or cash awards, for example. In one embodiment, the prize awards designations may be dynamically assigned. For example, events on the primary game may allow certain prizes (e.g., tangible prizes) to be made available on the prize value wheel 14.

When the countdown game 10 is activated, the prize value wheel 14 rotates and "lands" on a prize value so that one of the prize values is selected and identified across payline 18. (This prize value amount may be randomly selected or may be predetermined if drawn from a finite-pool of results). This prize value amount is accumulated with previous prize value amounts (if any) for display by the prize display 20. As described previously, when play is first initiated (or otherwise reset), the countdown wheel 12 is normally reset to the initial position "BLANK". When game play is first initiated (or otherwise reset), the accumulated prize value amount indicated in the prize display 20 is also reset to zero or other reset value amount.

The countdown adjuster wheel 16 includes indicia along its periphery corresponding to a plurality of stop adjustments. The selected or identified stop adjustment is indicated by the payline 18 across the countdown adjuster wheel 16. The example stop adjustments of FIG. 1 include "Skip 1", "Back 2", "BLANK", "Skip 3", and "Skip 2." As noted above, according to other embodiments of the invention, the stop adjustments may specify adjustments to the primary game, such as reel nudging, re-spins of reels, or bonus game play on the primary game, for example. In yet other alternative embodiments, the stop adjustment may specify adjustments to the prize wheel 14, providing another level of game diversity.

When the countdown game 10 is activated, the countdown adjuster wheel 16 rotates and "lands" on a stop adjustment so that one of the stop adjustments is selected and identified across payline 18. (This selected stop adjustment (which ultimately affects the outcome of countdown game 10) may be randomly selected or may be predetermined if drawn from a finite-pool of results).

The selected stop adjustment is used to "adjust" the countdown wheel 12 zero or more stop positions from its current position. For example, a stop adjustment of "Skip 1" would advance the countdown wheel 12 one stop position counter-clockwise (e.g., from 17 to 16). A stop adjustment of "Back 2" would adjust the countdown wheel 12 two stop position clockwise (e.g., from 15 to 17). A stop adjustment of "BLANK" would reset the countdown wheel 12 to the initial position of "BLANK" and would also reset the prize display 20 to zero. Although not shown in the FIG. 1 example, a stop adjustment of "0" could also be implemented so that if selected, the countdown wheel 12 is not affected.

In the preferred embodiment, the determination of whether the countdown wheel 12 lands on a "winning" on "non-winning" stop position is not carried out until after the countdown adjuster wheel 16 adjusts the final position of the countdown wheel 12 as described more fully below in conjunction with FIG. 2. However, the present invention also contemplates that the determination of whether the countdown wheel 12 lands on a "winning" on "non-winning" stop position need not require that the countdown adjuster wheel 16 and/or prize value wheel 14 be first applied.

The method and operation of invention will be more fully understood with reference to the logical flow diagram of FIG. 3, as well as FIG. 1, FIG. 2 and FIG. 4. FIG. 3 is a logical flow diagram generally depicting the acts associated with carrying out the example countdown game 10 of FIG. 2 in accordance with the invention. The order of actions as shown in FIG. 3 and described below is only illustrative, and should not be considered limiting.

First at block 100, the countdown game 10 is reset. When the countdown game 10 is reset, the countdown wheel 12 is set to its initial "BLANK" position and the prize display 20 is reset to zero (0) or other reset value. The countdown game 10 may be reset upon the occurrence of a variety of events, including when play is first initiated on the gaming device, when the countdown wheel 12 lands on a "winning" stop position and the player is awarded the prize value of the prize display 20, when the countdown adjuster wheel lands on "BLANK", or when a non-triggering event occurs on the primary game, for example.

Next at block 110, the player initiates game play of the primary game. For example in a slot primary game, the player initiates play of the slot reels.

Next at decision block 120, the primary game is evaluated to determine whether a countdown game triggering event has occurred. As noted above, the triggering event may be any win, special symbol(s), or other designated display indicators occurring on the primary game. If a triggering event has occurred processing continues to block 130, otherwise, the countdown game is reset at block 100. As noted above, in alternative embodiments, the countdown game 10 need not reset simply upon the occurrence of a non-triggering game event. Thus, the reset may simply be omitted or may be carried according to other game rules, such as the requirement of a predetermined number of non-triggering game events.

At block 130, the countdown wheel 12 is decremented a predetermined number of stop positions from its current position. In the preferred embodiment, the countdown wheel 12 is decremented one stop position. For example, if the countdown wheel 12 is currently at "BLANK", the countdown wheel 12 advances to stop position "17". Similarly, if the countdown wheel 12 is currently at stop position "15", the countdown wheel 12 advances to stop position "14". According to an alternative embodiment, indicia (or combination of indicia) indicated by the result of the primary game may define the number of stop positions to decrement the countdown wheel 12.

Next at block 140, the prize value wheel 14 and the countdown adjuster wheel 16 is rotated. This process may be carried out at the same time the countdown wheel 12 is decremented at block 130.

Next at block 150, the prize value wheel 14 stops so that payline 18 indicates one of the prize values on the prize value wheel 14. As described above, the prize value wheel 14 may be caused to rotate and stop according to a randomly generated process or according to a predetermined result drawn from a finite-pool. At block 160, the selected prize value is then added to (accumulated with) the currently accumulated prize value (if any). The resulting accumulated prize value is then indicated on the prize display 20.

At block 170, the countdown adjuster wheel 16 stops so that payline 18 indicates one of the stop adjustments indicated by the countdown adjuster wheel 16. As described above, the countdown adjuster wheel 16 may be caused to rotate and stop according to a randomly generated process or according to a predetermined result drawn from a finite-pool.

Next at block 180, the countdown wheel 12 is adjusted from its current position according to the selected stop adjustment from block 170. For example, a stop adjustment of "Skip 1" would advance the countdown wheel 12 one stop position counter-clockwise (e.g., from 17 to 16). A stop adjustment of "Back 2" would adjust the countdown wheel 12 two stop position clockwise (e.g., from 15 to 17). A stop adjustment of "BLANK" would reset the countdown wheel 12 to the initial position of "BLANK" and would also reset the prize display 20 to zero.

At decision block 190, the countdown game 10 evaluates the "final" position of the countdown wheel 12 after adjustment by the primary game and the countdown adjuster wheel 16. The final position is that which is indicated by payline 18 across the countdown wheel 12. If the resulting stop position is a "winning" stop position, processing continues to block 200 where the player is awarded the prize value in the prize display 20 and the countdown game 10 is reset at block 100. Otherwise, a "non-winning" stop position has been reached and decision block 210 is then carried out.

At decision block 210, the countdown game 10 determines if the countdown adjuster wheel 16 indicates a "BLANK" stop adjustment. If so, the countdown game 10 is reset and processing returns to block 100. Otherwise, the current stop position of the countdown wheel 12 and the collection of prizes in the prize display 20 are maintained, and processing returns to block 110, where the player subsequently plays the primary game to progress further in the countdown game 10.

Accordingly, it will be seen that this invention provides a countdown game providing enhanced game play of gaming device by providing a "countdown indicator" which advances and retreats through various stages or levels of play and which further allows the player to accumulate a prize amount which may be won, lost or increased during play. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A gaming device having a primary game whose outcome is at least partially determined by chance and a bonus game, the bonus game comprising:

a first, a second, and a third concentrically mounted wheel, each wheel having a plurality of stop positions located at an approximately equal distance from a center axis and further such that each wheel's stop positions are visually distinguishable from each of the other two wheel's stop positions, configured such that each wheel is individually controllable by said gaming device, and, a prize value counter showing a current value of any bonus prizes won during bonus game play;

logic in said gaming device operably disposed therein and usable to control movement of said wheels, configured to trigger a bonus game upon occurrence of a predetermined event in said primary game, said bonus game comprising the movement of at least two of said three concentrically mounted wheels and ending when said at least two concentrically mounted wheels stop and any prize values indicated are added or subtracted from said prize value counter;

where said three concentric wheels are further configured such that each of said first wheel's stop positions correspond to one of a win symbol or a non-win symbol, each of said second wheel's stop positions correspond to prize values, said prize values usable in calculating an amount awardable at the completion of a bonus game, and each of said third wheel's stop positions correspond to one of a number or a symbol usable to change a position of said first wheel from one stop location to another stop location before a bonus game completes; and where said logic is further configured such that for said bonus game, one of said at least two wheels used in said bonus game is always said first wheel.

2. The gaming device of claim 1 where said first wheel has a diameter larger than said second and third wheels.

3. The gaming device of claim 2 where said second wheel has a diameter larger than said third wheel.

4. The gaming device of claim 1 where said bonus game further comprises the movement of all three wheels during each bonus game.

5. The gaming device of claim 4 where said logic is further configured to stop said first wheel while at least said third wheel is still moving, and upon stopping said third wheel changing a stop position of said stopped first wheel in accordance with a number or symbol indicated at a stop position of said third wheel.

6. The gaining device of claim 1 where said at least two wheels used in a bonus game further includes said second wheel, and where said second wheel is used to indicate a prize value to awarded in conjunction with a win position on said first wheel.

7. A method of playing a bonus game at a gaming device, the gaming device having a primary game whose outcome is at least partially based on chance, comprising:

providing three concentric wheels usable in a bonus game, said wheels individually rotatable, further comprised of a first wheel having at least one win indicator thereon, a second wheel having at least one win value or win item thereon, and a third wheel having at least one indicator usable to indicate a change in position of said first wheel;

recognizing an event in said primary game which is used to start a bonus game;

starting said bonus game by spinning said concentric wheels;

halting said spinning wheels;

moving said first wheel in accordance with said third wheel, if said third wheel is stopped such that a change of position of said first wheel is indicated; determining if said first wheel is in a win stop position;

using said second wheel to determine an amount to award if said determined position of said first wheel is a win position; and awarding said determined amount by adding said determined amount to a win counter viewable by a player.

8. The method of claim 7 further comprising:

providing a start position on said first wheel;

providing a final position on said first wheel;

moving said first wheel in a manner that progresses from said start position towards said final position over a plurality of bonus games.

9. The method of claim 8 further comprising:

awarding an additional bonus amount if said first wheel stops on said final position.

10. A gaming device having a primary game whose outcome is at least partially based on chance and a bonus game, comprising:

means for using three individually controllable concentric wheels in a bonus game, where said three wheels comprise a first wheel having at least one win indicator thereon, a second wheel having at least one win value or win item thereon, and a third wheel having at least one indicator usable to indicate a change in position of said first wheel;

means for recognizing an event in said primary game which is usable to start a bonus game;

means for using a known bonus game win amount, including a non-win of 0 value, to determine where said wheels will stop so as to show a value won equal to said known bonus game win amount;

means for starting said concentric wheels spinning after recognizing said bonus game start event;

means for controllably halting said spinning wheels in a manner consistent with said known bonus game win amount;

means for adjusting said first wheel either backwards or forwards in accordance with said third wheel, where said third wheel and said first wheel are initially stopped at locations which will result in the final position of said first wheel showing either a win or a non-win in accordance with said known bonus game amount;

means for stopping said second wheel to show an amount to award if said known bonus game win amount is not 0; and means for indicating an amount won by adding said known bonus game win amount to a win counter viewable by a player.

11. The gaming device of claim 10 further comprising:

means for initializing said bonus game at a start position on said first wheel;

means for indicating a final position on said first wheel;

means for moving said first wheel in a manner that progresses from said start position towards said final position over a plurality of bonus games.

* * * * *